(12) United States Patent
Garner

(10) Patent No.: US 6,837,504 B2
(45) Date of Patent: Jan. 4, 2005

(54) SCOOTER STABILIZING SYSTEMS AND METHODS

(76) Inventor: Philippa V. Garner, 600 W. San Francisco St., Santa Fe, NM (US) 87501

(*) Notice: Subject to any disclaimer, the term of this patent is extended or adjusted under 35 U.S.C. 154(b) by 56 days.

(21) Appl. No.: 10/262,821

(22) Filed: Oct. 1, 2002

(65) Prior Publication Data

US 2004/0061299 A1 Apr. 1, 2004

(51) Int. Cl.$^7$ .................................... B62M 1/00
(52) U.S. Cl. ......................... 280/87.041; 280/288.4
(58) Field of Search ................... 280/87.01, 87.021, 280/87.041, 288.4, 304.3

(56) References Cited

U.S. PATENT DOCUMENTS

| | | | | | |
|---|---|---|---|---|---|
| 2,778,370 | A | * | 1/1957 | Chamblee | 135/68 |
| 3,044,797 | A | * | 7/1962 | Borland | 280/87.051 |
| 4,166,630 | A | | 9/1979 | Sullivan et al. | 280/87.02 R |
| 4,623,158 | A | * | 11/1986 | Monreal | 280/11.12 |
| 4,676,521 | A | | 6/1987 | Monreal | 280/606 |
| 4,867,188 | A | * | 9/1989 | Reid | 135/67 |
| 5,156,031 | A | * | 10/1992 | Gaul | 70/233 |
| 5,470,089 | A | * | 11/1995 | Whitson et al. | 280/87.041 |
| D392,001 | S | * | 3/1998 | Chen | D21/423 |
| 5,899,474 | A | * | 5/1999 | Grutzik | 280/229 |
| 5,992,864 | A | * | 11/1999 | Dickson et al. | 280/87.041 |
| 6,273,439 | B1 | * | 8/2001 | Ray et al. | 280/87.041 |
| 6,450,516 | B1 | * | 9/2002 | Nall, III | 280/87.021 |
| 6,634,660 | B2 | * | 10/2003 | Miller | 280/87.021 |

FOREIGN PATENT DOCUMENTS

| | | | | |
|---|---|---|---|---|
| FR | 2818610 | * | 6/2002 | 280/288.4 |
| JP | 11-310176 | * | 11/1999 | 280/288.4 |

* cited by examiner

*Primary Examiner*—Christopher P. Ellis
*Assistant Examiner*—Jeff Restifo
(74) *Attorney, Agent, or Firm*—Luis M. Ortiz; Kermit D. Lopez

(57) ABSTRACT

A foot scooter adapted with a stabilizing mechanism secured to hardware associated with the upper assembly of the scooter in front of a use's knee high location. The stabilizing mechanism includes a padded receiver adapted to firmly and comfortably hold a user's knee within the receiver during scooter operation. The padded receiver has a recessed center comprised of resilient material adapted for receiving a user's knee and further comprising an outer ridge comprised of resilient material adapted for firmly holding the user's knee within the recessed center. The stabilizing mechanism can be adjustably secured the frame of a scooter using an adjustment mechanism. The adjustment mechanism can include a quick release mechanism. The adjustment mechanism can also include a guide to limit adjustment/movement of the adjustment mechanism along the scooter frame.

20 Claims, 6 Drawing Sheets

SCOOTER STABILIZING SYSTEMS AND METHODS

FIELD OF THE INVENTION

The present invention is generally related to scooters. More particularly, the present invention is related to systems and methods of providing stability to scooters.

BACKGROUND

Foot scooters continue to be popular because they provide a very convenient means of transport and a source of enjoyment for the riders. The convenience in storing scooters when they are not being used provides one great advantage they have over bicycles and other common forms of vehicle. Many improvements have been made to scooters over the years. For example, scooters are now capable of being folded for added ease in storage. Larger bicycle tires, hand brakes, fenders and wider riding bases are also common features with heavier duty scooters.

Scooters are being viewed as a human mobility alternative with many applications. For example, the scooter contributes to human mobility in poverty-stricken places, such as third world countries. Industrial applications are foreseeable where scooter use can enable transportation of personnel in plants and other industrial setting. Furthermore, scooter would help as a factor in the reduction of pollution. A good example of widespread human mobility program is the Yellow Bike concept, which originated in the Netherlands. The Yellow Bike concept was a program that provided free bikes for use within a community. Such a concept was implemented but failed in Portland because the bikes could not be maintained in working order. It is possible that scooters might make this utopian idea practical because they generally require less maintenance and storage. Otherwise, scooters will always have their place in society as recreational equipment.

Although scooters are available in a variety of configurations, a basic physical principle necessary for their use will always apply. A scooter must be propelled, or thrust, forward into motion by its user. Although a motor associated with a foot scooter might enables a rider to keep up with slow moving traffic such as in a city and the freedom from having always us a leg to propel the scooter, there is still a need to physical operate a scooter where the battery or fuel has run out. Human physical power will also inevitably result in issues over scooter and user stability, as well as and user fatigue.

The present inventor has recognized that a need exists in the art for enhanced foot scooter stability during operation. Despite the long-enjoyed utility and growing interest in scooter use worldwide, the present inventor believes that scooters can still benefit from improvements that reduce rider fatigue, enhance user efficiency and provide additional safety to its users. The present inventor, therefore, discloses foot scooter stabilizing systems and methods that can accomplish shortcomings associated with current foot scooters.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

In accordance with a feature of the present invention, a foot scooter can be provided with a knee-based stabilizing mechanism.

In accordance with another feature of the present invention, a stabilizing mechanism adapted for use with foot scooters can be provided in the form of a knee support. The knee support can serve as a rest and stabilizer for a scooter operator's supporting (e.g., riding) leg.

In accordance with another feature of the present invention, a knee support can be attached to the scooter's upper frame assembly and/or along the steering mechanism shaft of an existing scooter.

In accordance with yet another feature of the present invention, the knee support can include a padded receiver.

In accordance with another feature of the present invention, the knee support can be attached to the upper assembly of a foot scooter in a manner that allows the knee support to be ergonomically adjusted along the upper assembly of a scooter to provide for a full range of users.

In accordance with a preferred embodiment of the present invention, a knee support can be adapted to receive the knee of a user's supporting, not thrusting, leg. A padded receiver can be included with the knee support to provide comfort to the user. The knee support serves at least two purposes: it can firmly supports a user and scooter as a more cohesive, stable unit; and it can provide a firm base upon which forward thrust can be more directly applied to a cohesive rider-scooter unit resulting in a more effective, less tiresome operation experience. More force provided by the user's thrusting leg can now be applied directly forward into a scooter, via the stabilizing system, without the loss of energy, stability and/or efficiency typically experienced with prior foot scooters and by their operators.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF PREFERRED EMBODIMENTS

The particular values and configurations discussed in these non-limiting examples can be varied and are cited merely to illustrate an embodiment of the present invention and are not intended to limit the scope of the invention.

The simplicity of the scooter can give it some advantages over a regular bicycle. Some advantages are: low cost, lightweight, nearly maintenance free, and one-size fits-most. Scooters, however, are known to become easily unbalanced when a user aggressively thrusts the scooter forward through the application of repetitive forward strokes along the ground with the foot of the user's thrusting leg. A scooter rider's center of gravity is typically high and forward compared to a bicycle, which can result in scooter/user instability during scooter operation. Furthermore, thrusting by scooter operators' is not generally as efficient where the only points of force are at the handle bar and base where a user's hands and supporting foot, respectively, are in contact with a scooter. Thrust is less efficient where the handle bar is not in rigid and constant contact with the user because too many variables contribute to absorption or dampening of thrust before force can be applied at the handle bar. The user cannot be in optimum contact with the scooter via the handle bar because of the flexibility and range of motion located in the user's elbows, shoulder's, and hands during scooter operation experience. Furthermore, any force that could be applied to the base via the user's riding foot is actually perpendicular to a user's vector of movement along a road or surface. Therefore, the base generally provides even less effective forward thrust energy to the scooter.

As taught with the following description of the present invention, bracing the user's supporting leg firmly against the scooter's frame can increase the user's thrusting power by the propelling leg. The stabilizing mechanism described herein can allow the advantages of scooters to be more fully realized. The present invention overcomes limitations associated with use of the scooter, making it a practical alternative to the bicycle.

Figure 1:
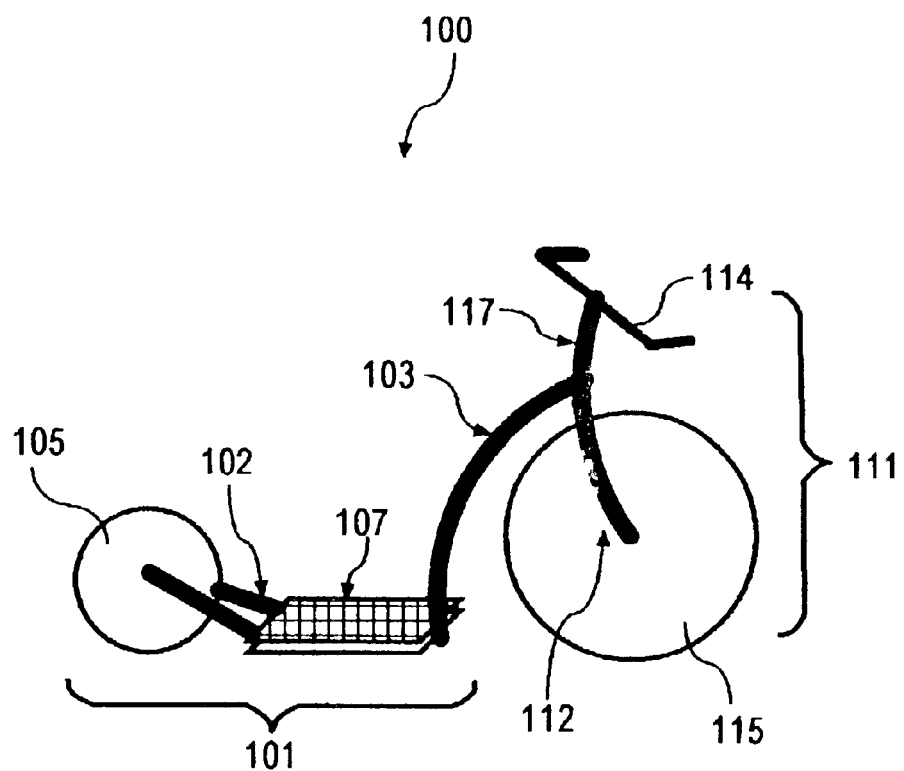
FIG. 1 illustrates a side perspective view of a prior art scooter, which is a generalized example of the type of scooter than can benefit from implementation of the present invention, which can be implemented in accordance with a preferred embodiment of the present invention.

Referring to FIG. 1, a prior art scooter 100 is illustrated. A typical scooter will have an upper assembly 111 and lower assembly 101. The lower assembly 101 typically includes at least one rear wheel 105 connected to a lower frame 102 and including a base 107 that serves as the support platform for most of a user's weight. It should be appreciated by those skilled in the art that lower assembly 101 can also include other hardware and options not shown in FIG. 1. For example, the lower assembly 101 can also include a fender and rear brake assembly.

The upper assembly 111 typically includes an upper frame 103 that can be provided in the form of a metal tube. The upper frame can be further adapted to include a steering mechanism 117. A steering mechanism 117 will typically include a hollow metal tube, a metal rod or pipe connecting handle bar 114 with a front wheel fork 112, bearing, and seals. Wheel fork 112 retains a front tire 115. Again, it should be appreciated that a hand brake assembly (not shown) and front fender (not shown) can also be provided in associated with wheel fork 112 and front tire 115.

Figure 2:
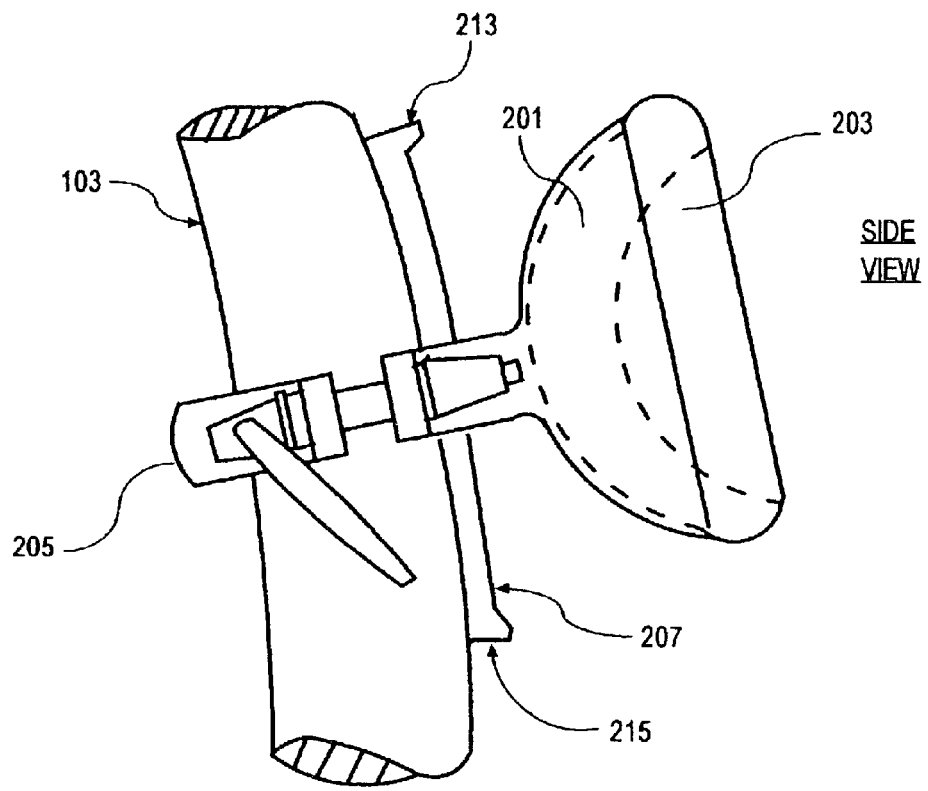
FIG. 2 illustrates a side perspective view of a scooter frame including a stabilizing mechanism in the form of a knee support, which can be attached to the scooter frame used to stabilize a scooter in accordance with a preferred embodiment of the present invention.

Referring to FIG. 2, a side view of the upper frame 103 of FIG. 1 is shown adapted with a knee support 201 is illustrated. Knee support 201 can include a padded receiver 203, adjustment mechanism 205 and guide 207. As shown in FIG. 2, knee support 201 can also contain a padded receiver 203. The knee support 201 can be provided in the form of a cup, bowl or depression and padded receiver 203 can include a resilient material, such as foamed rubber. The padded receiver 203 will preferably be designed of materials that can accept and firmly hold a user's knee in place within the knee support 201. The adjustment mechanism 205 can include a thumb-tightening bolt and nut mechanism generally known in the bicycle art and sometimes referred to as a "quick release" mechanism. The adjustment mechanism will preferably allow a user to easily loosen and move (e.g., move upward and downward) the knee support 201. A guide 207 can limit the Knee support's 201 movement. The guide 207 can provide upper 213 and lower 215 limits for movement of the knee support 201, and can also be adapted to limit or prevent the knee support from turning away from it normal position, which would be generally facing toward the user. It should be appreciated that knee support 201 can be manufactured from many rigid materials, including, plastics such as rubber, foamed rubber, and soft plastics, and metals such as aluminum and steel.

Figure 3:
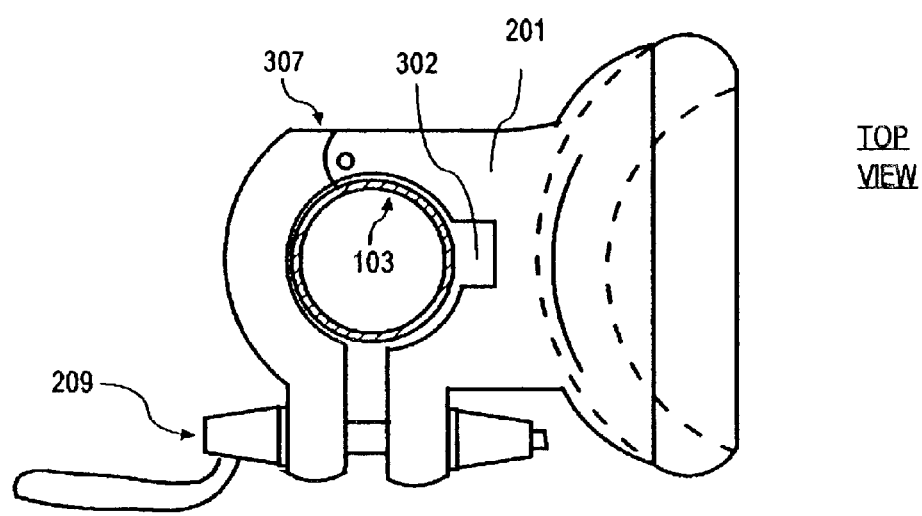
FIG. 3 illustrates a top perspective view of the stabilizing mechanism of FIG. 2, which can be can be used with a scooter in accordance with a preferred embodiment of the present invention.

Referring to FIG. 3, a top view of knee support 201 attached to a scooter's upper assembly frame 103 is illustrated. As shown in FIG. 2, knee support 201 can also provide a track 302 associated therewith (e.g., track 302 can be mounted to the frame 103) along which knee support 201 can be adjusted or guided. The track 302 can prevent, or limit movement of knee support 201 away from a user. It should be appreciated that the size of the track and complimentary guide 304 that can be located on the knee support 201 can be adjusted to allow for some rotational movement left or right on the support tube, away from its position directly facing a user. Also shown in FIG. 3 is an optional hinge 307 that can be provided on the knee support 201 so that it can be easily provided as an after market system for use with older scooters. A quick release mechanism 209 is also shown in FIG. 3. It should be appreciated that the knee support 201 and guide 207 can be provided as an aftermarket product, or can be integrated with newly manufactured scooters, in which case hinge 307 would not be necessary.

Figure 4:
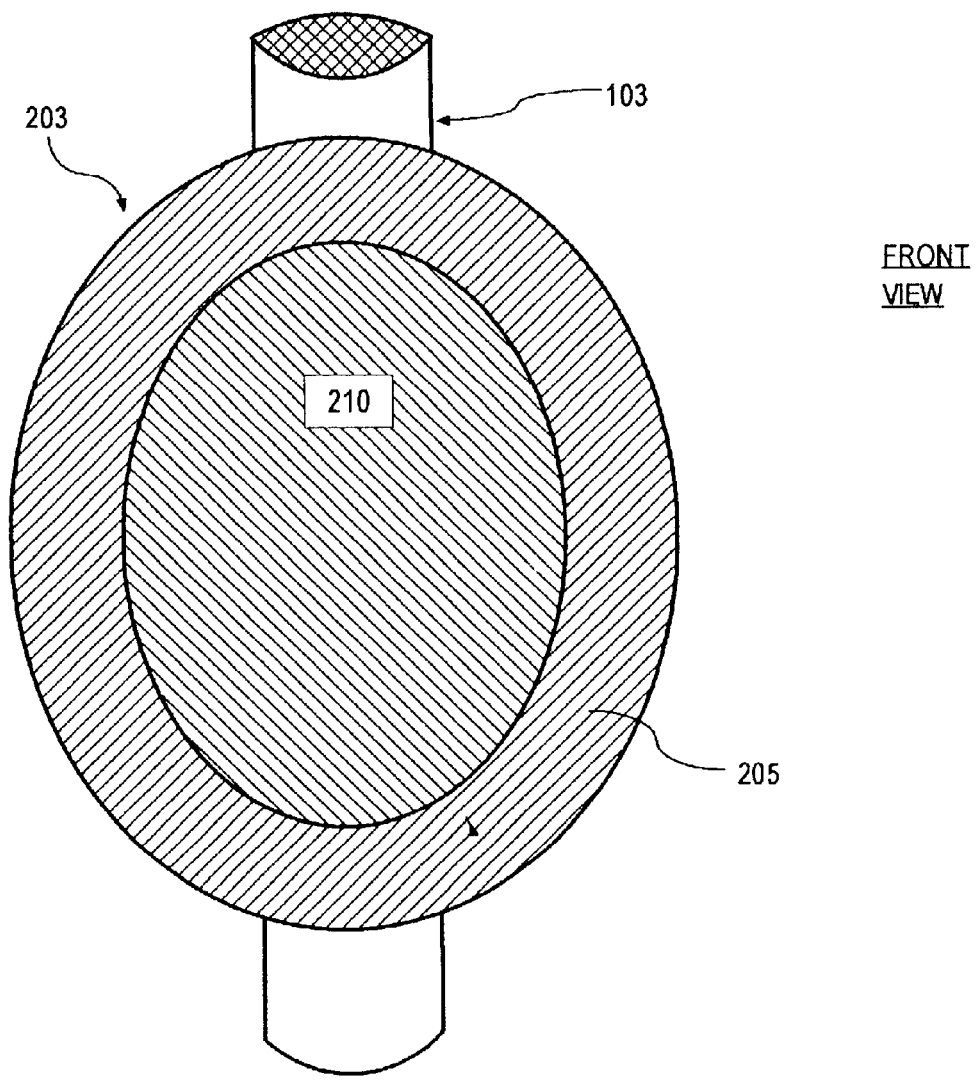
FIG. 4 illustrates a perspective front view of a scooter including a stabilizing mechanism, which can be can be used with a scooter in accordance with a preferred embodiment of the present invention.

FIG. 4 illustrates a front view of a padded receiver 203 in position at the front of a scooter frame 103, where it would be attached via knee support 201 (not shown). In the frontal view, the padded receiver 203 is shown having an outer ring 205, which can be made of firm foam or rubber material in order to effectively maintain a user's knee within the knee support 201 shown in FIG. 2. The inner padding 210, however, can be provided as a softer, more resilient material that will allow a user's knee to be partially absorbed and comfortably held firmly within the knee support 201. The inner padding 210 should be placed at a suitable depth (e.g., ½–2 inches) compared to outer ring 205 in order to be effective in firmly securing a user's knee. Such depth can be accomplished during manufacturing by means known in the art. For example, outer ring 205 can be assembled over inner padding 210 in order to accomplish depth. Outer ring 205 and inner padding 210 can also be manufactured as a single unit prior to assembly with knee support 201, which would be provided as a more rigid material (e.g., molded plastic, aluminum, etc.).

Figure 5:
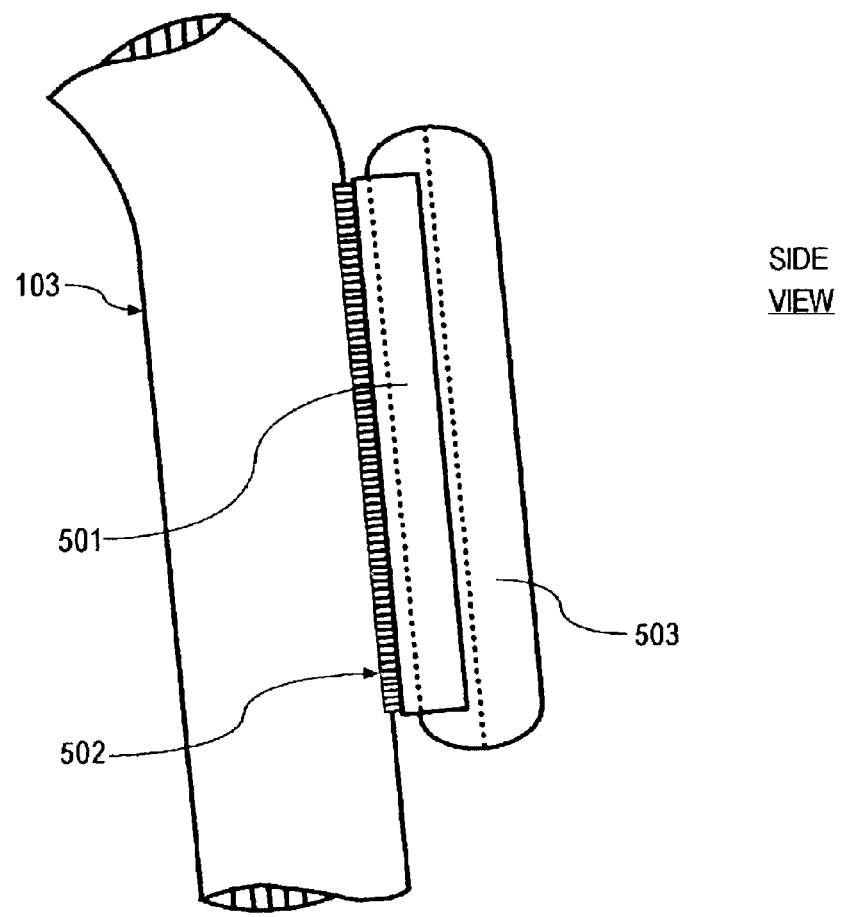
FIG. 5 illustrates a side perspective view of a scooter frame including a stabilizing mechanism in the form of a knee support, which can be attached to the scooter frame used to stabilize a scooter in accordance with a preferred embodiment of the present invention.

Referring to FIG. 5, a side view of a support tube 103 adapted with a knee support 501 is illustrated. Knee support 501 can include a padded receiver 503 as an alternate embodiment of the present invention. Unlike the knee support 201 described above, however, knee support 501 does not require an adjustment mechanism 205 and guide 207. As shown in FIG. 5, knee support 501 and padded receiver 503 can be designed to be long enough to accommodate various user knee heights. The knee support 501 can be provided in the form that will support and maintain the padded receiver 203 in a arched fashion so that a user's knee is substantially prevented from slipping out of contact with the knee support 501 and padded receiver 503, which in combination act as a stabilization mechanism. The knee support 501 can be welded 502 to the scooter frame 103 during scooter manufacturing, or as an after market addition. Again, the padded receiver 503 can include a resilient material, such as foamed rubber. The padded receiver 503 will preferably be designed of materials that can accept and firmly hold a user's knee in place within the knee support 501. Again, it should be appreciated that knee support 501 can be manufactured from many rigid materials, including, plastics such as rubber, hard plastics, and metals such as aluminum and steel.

Figure 6:
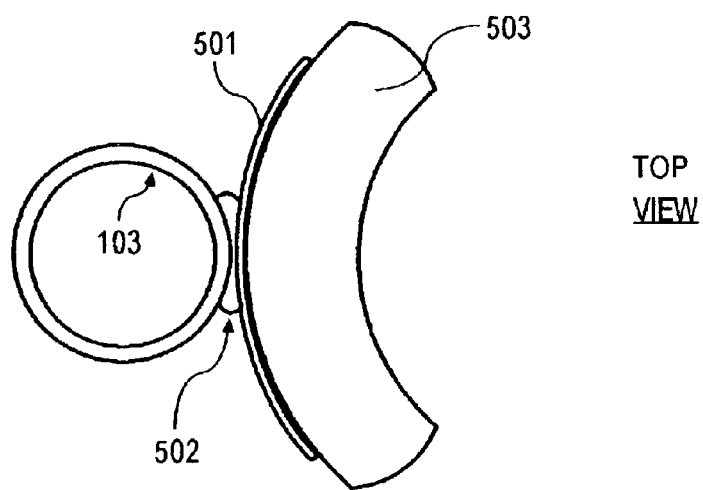
FIG. 6 illustrates a top perspective view of the stabilizing mechanism of FIG. 5, which can be can be used with a scooter in accordance with a preferred embodiment of the present invention.

Referring to FIG. 6, a top view of knee support 501 attached to a scooter's upper assembly frame 103 is again illustrated. Shown is the formation of the padded receiver 503 and knee support 501 in an arch like design, in order to minimize unintended user knee movement out of the padded receiver 503. The knee support frame 501 is shown welded 502, or otherwise affixed (e.g., glued or screwed) to the scooter frame 103.

It should be appreciated that an adjustment mechanism, such as adjustment mechanism 205 shown in FIG. 2, can be included with the present embodiment, which can also include a "quick release" mechanism. Rather than just allow a user to easily loosen and move (e.g., move upward and downward) the knee support 501, an adjustment mechanism would allow the knee support 501 to be mounted to foot scooters as an after market product. Furthermore, a track, such as track 302 shown in FIG. 3, can prevent or limit any movement of knee support 501 from moving away from a user during use. Also shown in FIG. 3 an hinge 307 would be useful if provided on a knee support 501 that would include an adjustment mechanism so that the knee support 501 can be easily provided as an after market system for use with older scooters.

Figure 7:
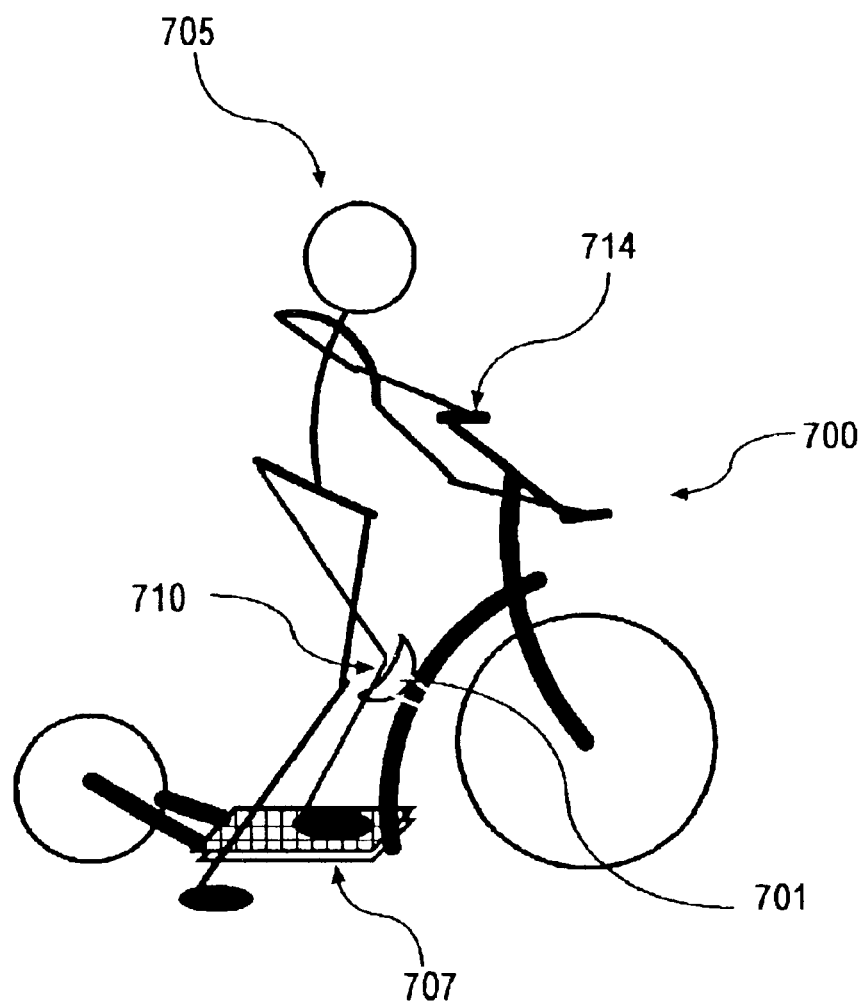
FIG. 7 illustrates a scooter adapted with a stabilization mechanism, in accordance with a preferred embodiment of the present invention.

FIG. 7 illustrates a scooter 700 having a stabilizing mechanism 701 attached thereto. Stabilizing mechanism 701 can be provided in the form of a knee support, such as knee supports 201 or 501 described above with reference to FIGS. 2–6. As can be seen in FIG. 7, a person 705 can be firmly supported within the stabilizing mechanism 701 during scooter operation. A user 705 can experience more stability while using a scooter 700 having a stabilizing mechanism 701 because the user 705 is in contact at three points along a scooter 700. First, a user 705 is supported at the base 707. Next, a user is supported by handle bar 714. Finally, the user 705 is in contact by knee 710 at the stabilizing mechanism 701. A user 705 can thereby more effectively integrate his/her lower middle-lower body with a scooter at the stabilizing mechanism 701, handle bar 714 and supporting base 707 of the scooter 700 during operation.

Figure 8:
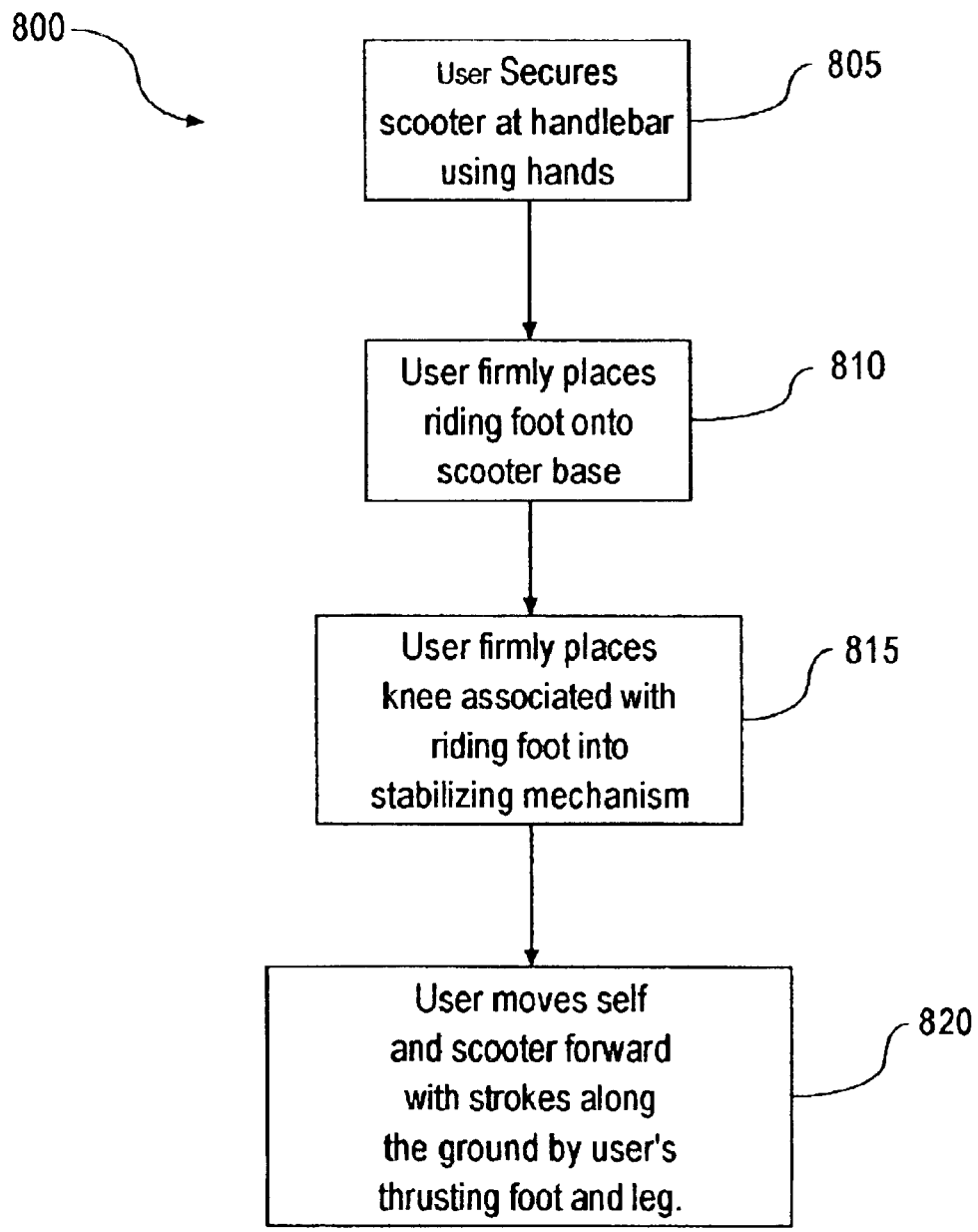
FIG. 8 illustrates a flow diagram of steps that can be taken to use the present invention, in accordance with a preferred embodiment of the present invention.

Referring to FIG. 8, a flow diagram of method steps 800 for using the present invention, in accordance with an embodiment of the present invention. During operation of a scooter adapted with a stabilizing mechanism as described herein, a user will first secure a scooter by holding a handle bar with his/her hands, as shown in block 805. As shown in Block 810, the user will then firmly place his/her riding foot onto the scooter's base. The user will then firmly place his/her knee associated with the riding foot into the stabilizing mechanism, as shown in block 815. Finally, as shown in block 820, the user can move him/her-self and the scooter forward with strokes along the ground by the user's thrusting foot and leg.

Using the herein described system and method, bracing the lower body against a knee support can prevent the rider from being thrown forward, and possibly seriously injured, should grip on the handle bars be lost. Without the knee support, a rider's supporting leg must bend under full body weight, with each stroke of the propelling leg, stressing the knee. This is tiresome and can lead to tendenitis. The knee support allows the supporting leg to relax. The crown of a road's surface can oftentimes requires the user's thrusting leg furthest away from center of the road, or opposite the crown of the road, to reach considerably further than the left. The knee support makes this reach less noticeable where road surface curvatures vary.

The present inventor believes that the enhanced scooter design described herein will appeal to scooter enthusiasts as well as a growing number of individuals finding scooter transportation to be a reasonable alternative to mobility in environments crowded with gas-powered vehicles and pedestrians. The present invention continues to develop a bridge being formed by scooters between walking and bicycling. Furthermore, scooters are a low-impact exercise alternative to jogging, yet the physical motion and energy usage are similar. Finally, a scooter adapted with the present invention can preserve and well as strengthen lower back and hips, and more effective focus exercise at the user's glutes.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

I claim:

1. A scooter, comprising:
  a lower assembly including a frame, base and rear tire supported by said frame;
  an upper assembly including a frame, a front wheel supported by a fork assembly, a shaft attached to said fork assembly, said shaft contained within said frame, and a handle bar assembly attached to said shaft, opposite said fork assembly;
  a stabilizing mechanism comprising a knee support adjustably secured to said frame, said knee support further comprising a padded receiver having a concaved center comprised of resilient material adapted for receiving a user's knee and further comprising an outer ring comprised of resilient material adapted for holding the user's knee within the concaved center and providing support to the user's knee during scooter operation; and adjustment mechanism adapted to adjustably secure the stabilizing mechanism to the frame.

2. The invention of claim 1, wherein said adjustment mechanism further comprises a quick release mechanism.

3. The invention of claim 2, wherein said adjustment mechanism further comprises a guide, said guide for limiting movement of the adjustment mechanism.

4. The invention of claim 1, wherein said adjustment mechanism further comprises a guide, said guide for limiting movement of the adjustment mechanism.

5. The invention of claim 4, wherein said adjustment mechanism further comprises a guide, said guide for limiting movement of the adjustment mechanism.

6. Stabilizing system for a scooter, comprising a stabilizing mechanism secured to a scooter's frame with adjustment mechanism adapted to enable the stabilizing mechanism to be adjusted along and about the frame at a position's about knee high above a base associated with said scooter, the stabilizing mechanism further comprising a knee support including a padded receiver having a recessed center comprised of resilient material adapted for receiving a user's knee and further comprising an outer ring comprised of resilient material adapted for firmly holding the user's knee within the recessed center.

7. The system of claim 6, wherein said adjustment mechanism further comprises a quick release mechanism.

8. The system of claim 6, wherein the outer ring forms a ring having an outer surface, the ring surrounding the recessed center such that the recessed center is located at a depth of about ½ to 2 inches from the outer surface of the ring.

9. The invention of claim 8, wherein said adjustment mechanism further comprises a quick release mechanism.

10. The invention of claim 9, wherein said adjustment mechanism further comprises a guide, said guide for limiting movement of the adjustment mechanism.

11. The invention of claim 8, wherein said adjustment mechanism further comprises a guide, said guide for limiting movement of the adjustment mechanism.

12. The invention of claim 11, wherein said adjustment mechanism further comprises a guide, said guide for limiting movement of the adjustment mechanism.

13. Stabilizing system adapted for use on a scooter frame, comprising:

a knee support including a padded receiver having a recessed center comprised of resilient material adapted for receiving a user's knee and further comprising an outer ring comprised of resilient material adapted for firmly holding the user's knee within the recessed center during operation of the scooter;

an adjustment mechanism adapted to enable the knee support to be adjusted along and about the frame at position's about knee high above a base associated with said scooter.

14. The invention of claim 13, wherein said adjustment mechanism further comprises a quick release mechanism.

15. The invention of claim 14, wherein said adjustment mechanism further comprises a guide, said guide for limiting movement of the adjustment mechanism.

16. The invention of claim 13, wherein said adjustment mechanism further comprises a guide, said guide for limiting movement of the adjustment mechanism.

17. The invention of claim 16, wherein said adjustment mechanism further comprises a guide, said guide for limiting movement of the adjustment mechanism.

18. The system of claim 13, wherein the outer ring forms a ring having an outer surface, the ring surrounding the recessed center such that the recessed center is located at a depth of about ½ to 2 inches from the outer surface of the ring.

19. The invention of claim 18, wherein said adjustment mechanism further comprises a quick release mechanism.

20. The invention of claim 18, wherein said adjustment mechanism further comprises a guide, said guide for limiting movement of the adjustment mechanism.

* * * * *